US011156268B2

(12) United States Patent
Buhrke

(10) Patent No.: US 11,156,268 B2
(45) Date of Patent: Oct. 26, 2021

(54) EPICYCLIC GEAR TRAIN AND WORKING VEHICLE HAVING AN EPICYCLIC GEAR TRAIN

(71) Applicant: DEERE & COMPANY, Moline, IL (US)

(72) Inventor: Frank Buhrke, Birkenau (DE)

(73) Assignee: DEERE & COMPANY, Moline, IL (US)

( * ) Notice: Subject to any disclaimer, the term of this patent is extended or adjusted under 35 U.S.C. 154(b) by 335 days.

(21) Appl. No.: 16/441,795

(22) Filed: Jun. 14, 2019

(65) Prior Publication Data

US 2020/0032879 A1   Jan. 30, 2020

(30) Foreign Application Priority Data

Jul. 25, 2018 (DE) .......................... 102018212425.6

(51) Int. Cl.
*F16H 3/58* (2006.01)
*F16H 57/08* (2006.01)
(Continued)

(52) U.S. Cl.
CPC .............. *F16H 3/58* (2013.01); *B62D 49/06* (2013.01); *F16H 57/08* (2013.01);
(Continued)

(58) Field of Classification Search
CPC .... F16H 3/58; F16H 57/08; F16H 2200/2035; F16H 2200/2007; F16H 2200/202;
(Continued)

(56) References Cited

U.S. PATENT DOCUMENTS

| 4,914,978 A * | 4/1990 | Moroto .................. F16H 3/663 475/71 |
| 6,929,584 B2 * | 8/2005 | Miyata ................ F16H 61/0206 477/119 |

(Continued)

FOREIGN PATENT DOCUMENTS

| DE | 142751 C | 7/1903 |
| EP | 0370298 A1 | 5/1990 |

(Continued)

OTHER PUBLICATIONS

European Search Report issued in counterpart European Patent Application No. 19187025.2 dated Dec. 13, 2019 (12 pages).

*Primary Examiner* — Tinh Dang

(57) ABSTRACT

An epicyclic gear train includes a housing, an input shaft, a first sun gear fixedly connected to the input shaft, an output shaft, a second sun gear fixedly connected to the output shaft, a planetary gear carrier arranged to be movable with respect to the first and second sun gears, and first and second planetary gears arranged to move on the planetary gear carrier. The planetary gears are fixedly connected to one another and disposed in engagement with the first and second sun gears, The epicyclic gear train further includes a first clutch device is disposed between the planetary gear carrier and the first sun gear, and a second clutch device is disposed between the housing and the planetary gear carrier. The first and second clutch devices block a relative movement between the planetary gear carrier and the first sun gear or between the planetary gear carrier and the housing.

20 Claims, 3 Drawing Sheets

(51) Int. Cl.
*F16H 3/56* (2006.01)
*B62D 49/06* (2006.01)

(52) U.S. Cl.
CPC .............. *F16H 2057/087* (2013.01); *F16H 2200/2007* (2013.01); *F16H 2200/2035* (2013.01)

(58) Field of Classification Search
CPC ......... F16H 61/0059; F16H 2200/0026; F16H 2200/2005; F16H 2200/0034; F16H 37/046; F16H 3/56; B60Y 2200/221
See application file for complete search history.

(56) References Cited

U.S. PATENT DOCUMENTS

| | | | |
|---|---|---|---|
| 6,935,985 B2 * | 8/2005 | Ishimaru | F16H 3/663 475/275 |
| 7,018,319 B2 * | 3/2006 | Ziemer | F16H 3/66 475/271 |
| 7,442,145 B2 * | 10/2008 | Raghavan | F16H 3/663 475/286 |
| 8,651,996 B2 * | 2/2014 | Mellet | F16H 3/62 475/276 |
| 2002/0045511 A1 * | 4/2002 | Geiberger | F16H 37/086 475/216 |
| 2002/0091032 A1 * | 7/2002 | Hayabuchi | F16H 37/04 475/278 |
| 2004/0026155 A1 * | 2/2004 | Miyata | F16H 61/0206 180/337 |
| 2006/0014604 A1 * | 1/2006 | Ziemer | F16H 3/666 475/296 |
| 2007/0281821 A1 * | 12/2007 | Raghavan | F16H 3/663 475/286 |

FOREIGN PATENT DOCUMENTS

| | | |
|---|---|---|
| WO | 8303289 A1 | 9/1983 |
| WO | 2016162304 A1 | 10/2016 |

* cited by examiner

EPICYCLIC GEAR TRAIN AND WORKING VEHICLE HAVING AN EPICYCLIC GEAR TRAIN

RELATED APPLICATIONS

This application claims priority to German Patent Application Ser. No. 102018212425.6, filed Jul. 25, 2018, the disclosure of which is hereby incorporated by reference in its entirety.

FIELD OF THE DISCLOSURE

The present disclosure relates to an epicyclic gear train having a housing, and in particular for being used in a working vehicle such as an agricultural vehicle.

BACKGROUND

In the case of working vehicles, in particular agricultural vehicles such as tractors, conventional gear train arrangements having a plurality of gears are used provided that transmissions that are not continuously variable. In the prior art, gear train arrangements are known that include multiple gear train units that are arranged one behind the other. These types of conventional gear train arrangements are used for the purpose of meeting the high requirements in relation to as fine a gradation as possible but also in relation to a wide range of transmission ratios. By way of example, a typical configuration of a gear train arrangement may thus comprise a multistage main shifting gear and a range group that is connected downstream. Moreover, so-called reversing units and, if necessary crawling speed gear reductions, are provided in agricultural commercial vehicles.

The main shifting gear is usually designed to be capable of being regularly power shifted under load, wherein the main shifting gear may be constructed in principle as a planetary gear or as a parallel shift gearbox. Essentially, when gear train components and drive train components are designed, a conflict of objectives develops between desired functionality and the available assembly space. By way of example, in tractors of the 130 PS class, the number of gears that are capable of being power shifted under load is thus typically 3 to 5. From a functionality point of view, however, 6 to 8 gears that are capable of being power shifted under load would be desirable both for field work as well as for transport work. Even if this may be acceptable in terms of price, the problem of integrating these additional gears that are capable of being power shifted under load into the existing assembly space still remains.

There is a need for improved functionality in a drive train with regard to the ability to power shift under load.

SUMMARY

In the present disclosure, an epicyclic gear train comprises a housing, an input shaft and a first sun gear that is fixedly connected to the input shaft, an output shaft and a second sun gear that is fixedly connected to the output shaft, a planetary gear carrier that is arranged so that it may move with respect to the first and second sun gear, and first and second planetary gears that are arranged so that they may move on the planetary gear carrier, the planetary gears being fixedly connected to one another and being respectively in engagement with the first and second sun gears, wherein a first clutch device is provided between the planetary gear carrier and the first sun gear, and a second clutch device is provided between the housing and the planetary gear carrier, the clutch devices blocking a relative movement between the planetary gear carrier and the first sun gear, or between the planetary gear carrier and the housing or both.

As a consequence, the epicyclic gear train may be embodied in a compact manner. The epicyclic gear train may be shifted by the clutch devices between two different ratios. In addition, there is the possibility, by simultaneously switching the two clutch devices, of blocking the entire power train of the epicyclic gear train. As a consequence, it is possible to realize a parking brake. It is possible by means of the ability to shift the planetary gear train by the two clutch devices to implement a higher ratio gear and a crawling gear. It is possible of embedding the epicyclic gear train in a drive train approximately in the position of a downstream gear train, to implement a high-low shift in a manner which saves space.

In a further embodiment, the clutch devices may be capable of being power shifted under load. The entire gear train consequently receives at least two further gears that render possible an increased spread of the gears which in addition may be power shifted under load. In this case, the comfort during use is increased. Thus, the entire drive train, by means of the use as a high-low shift, may be configured with a shortened installation length, wherein material and weight may be saved.

In the case of one embodiment, the clutch devices may be multi-plate clutches. It is possible by the formation as a multi-plate clutch for the clutches to be controlled by means of hydraulics. Components of the hydraulics are customary with the result that it is possible to rely on proven technology that renders possible a precise design.

In one embodiment, the epicyclic gear train may not comprise a ring gear. It is possible, by omitting a ring gear when the epicyclic gear train is constructed, to operate the epicyclic gear train independently of the different rotational speeds at the input shaft and output shaft. Furthermore, the efficiency of the epicyclic gear train may be increased by omitting the gear-meshing arrangement between the planetary gears and the ring gear since rolling friction losses are reduced.

In the case of a further embodiment, the first and second sun gear may comprise a different size or different module or a different pitch. As a consequence, the epicyclic gear train may be adjusted to the intended ratios. Furthermore, an optimal setting of torque and rotational speed may be set for a multi-stage gearbox that is arranged downstream.

In a further embodiment, the first and second planetary gears may comprise a different size, a different module, or a different pitch. As a consequence, the epicyclic gear train may be adjusted to the intended ratios. Furthermore, an optimal setting of torque and rotational speed may be set for a multi-stage gearbox that is arranged downstream.

In the case of a further development, a rotational speed of the output shaft may correspond to a rotational speed of the input shaft in the epicyclic gear train by closing the first clutch device. The rotational speed that prevails at the input shaft of the main shifting gear is transmitted directly to a multi-stage gearbox. This renders possible by way of example a low gear of the working vehicle, a so-called low mode. In this case, a high torque may be applied at low vehicle speeds. With the ability to shift, it is possible by fixing the first sun gear to the planetary gear carrier for the torque to be transmitted without further gear transmission ratio change to the drive train that is connected downstream.

A gear transmission ratio change occurs between the input shaft and the output shaft by means of closing the second clutch device. This renders possible a fixed transmission ratio between the input shaft and the output shaft. The planetary gears rotate in the opposite direction to the rotation of the sun gears. Typically, ratios of 2, 16 are used wherein the rotational speed of the output shaft with respect to the input shaft is increased by the factor. On account of the ability to shift, a further increase of the rotational speed and modelling of the torque may take place between the drive motor and a multi-stage gearbox that is connected downstream, wherein an enlargement of both the main shifting gear as well as the multi-stage gearbox is avoided. Simultaneously, the ability to power shift the epicyclic gear train under load renders it possible to use the vehicle without interrupting traction. This also improves the vehicle safety, particularly on slopes or during transporting tasks, wherein a procedure of stopping and setting off are omitted during shifting operations.

Working vehicle may have an epicyclic gear train as described above. The working vehicle may be used in diverse ways, wherein the advantages of the epicyclic gear train described herein render it possible to save assembly space. In this case, a new construction of the entire drive train may be avoided in that the epicyclic gear train is integrated approximately between a main shifting gear and a multi-stage gearbox. Further altering constructions of the transmission assemblies such as additional gear-meshing arrangements and auxiliary shafts are not necessary.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
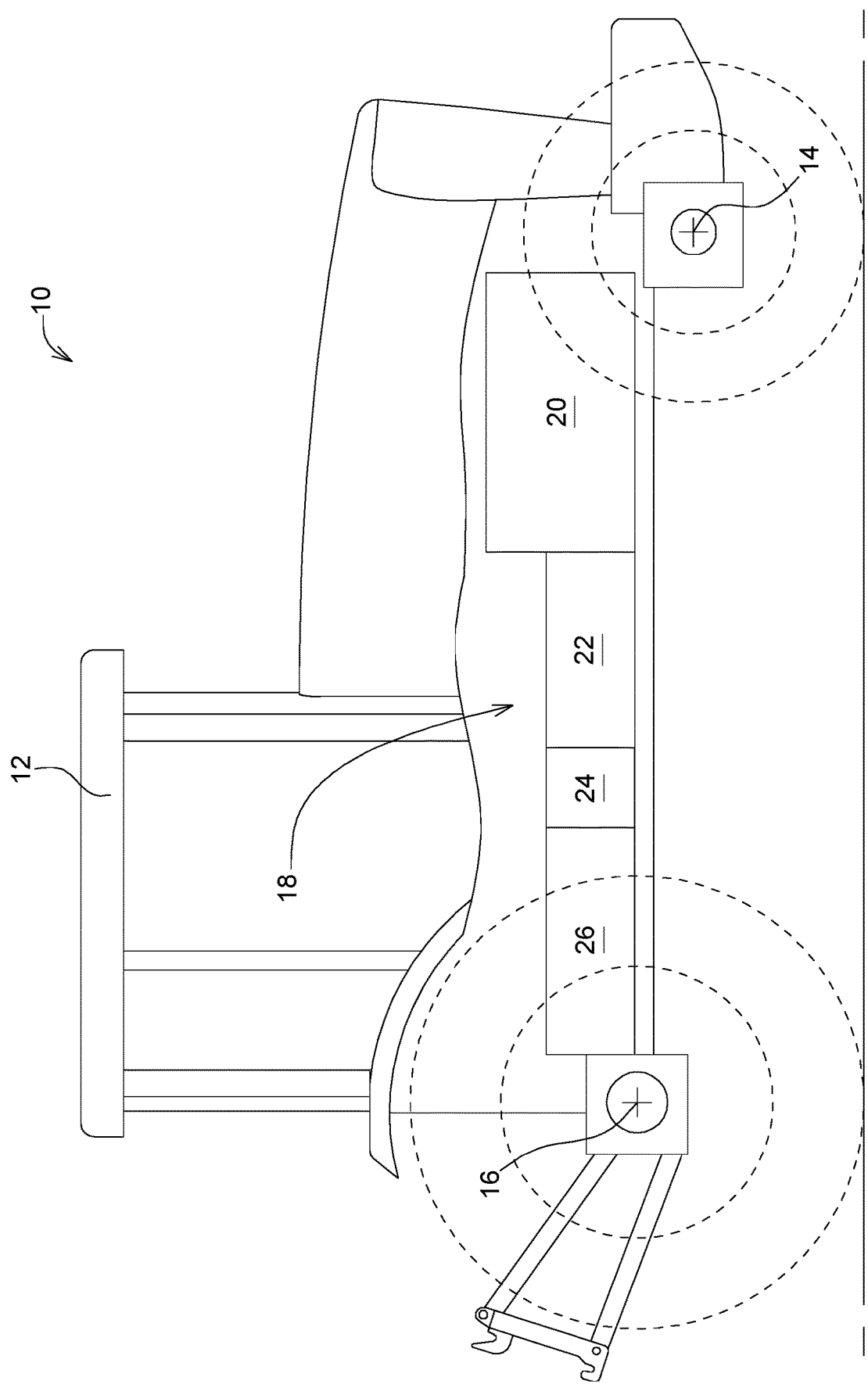
FIG. 1 illustrates a general view with an exemplary working vehicle.

FIG. 1 illustrates a working vehicle 10 having a cabin 12 and a drive train 18. The working vehicle may be a tractor, but may also be a construction machine. The working vehicle 10 includes a front vehicle axle 14 and a rear vehicle axle 16. The vehicle axles 14, 16 are a part of the drive train 18, wherein the working vehicle may be fitted with a front axle 14 that may be connected. Moreover, the drive train 18 comprises a drive motor 20 that may be embodied as an internal combustion engine or as an electric machine. The working vehicle 10 comprises a transmission structure in the drive train 18, where the transmission structure is assembled from various individual transmission components.

In the currently described transmission structure starting from the drive motor 20, a main shifting gear 22, a gearbox 24 that is connected downstream, and a multi-stage gearbox 26 are provided. Finally, depending upon the features of the working vehicle 10, a differential gear may be provided. The main shifting gear 22 may comprise a reversing unit that is used for reversing.

The shifting gear 24 that is connected downstream is embodied as an epicyclic gear train 24 and is integrated in the drive train between the main shifting gear 22 and, depending upon the embodiment of the working vehicle 10, a multi-stage gearbox 26 that is provided. The multi-stage gearbox 26 comprises multiple shafts having gear wheels that may be shifted, the gear wheels rendering different ratios possible.

Figure 2:
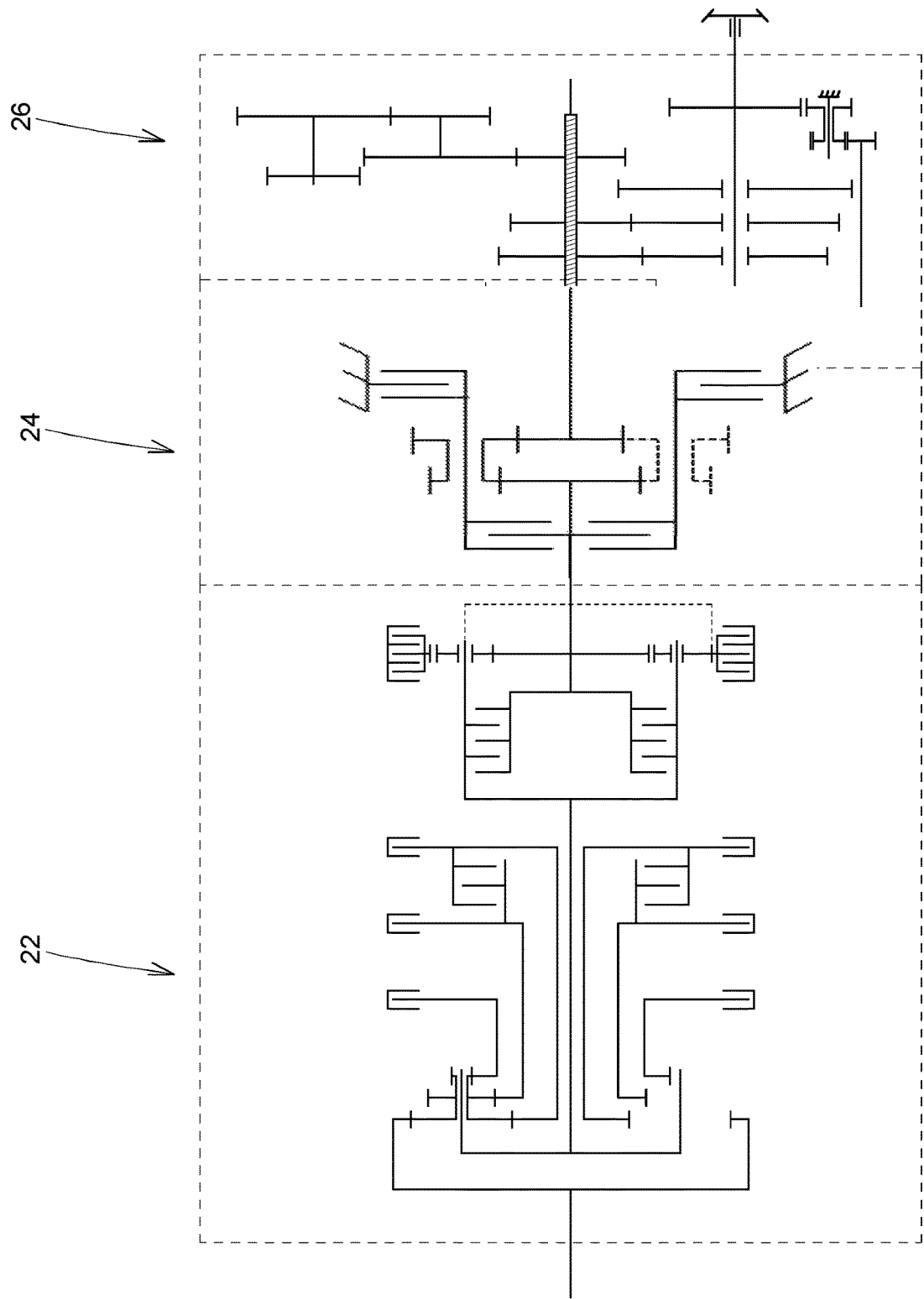
FIG. 2 illustrates an embodiment of a drive train.

FIG. 2 illustrates an exemplary construction of the transmission structure that is used in the drive train 18. In this case, starting from the drive motor 20, power is introduced into the main shifting gear 22. In FIG. 2, the main shifting gear 22 is illustrated in an exemplary manner with a ring gear and multiple sun gears. However, any other suitable construction may also be used for the main shifting gear.

The power is transmitted by means of the input shaft 28 from the main shifting gear 22 to the epicyclic gear train 24 and finally via the output shaft 30 to the multi-stage gearbox 26.

Figure 3:
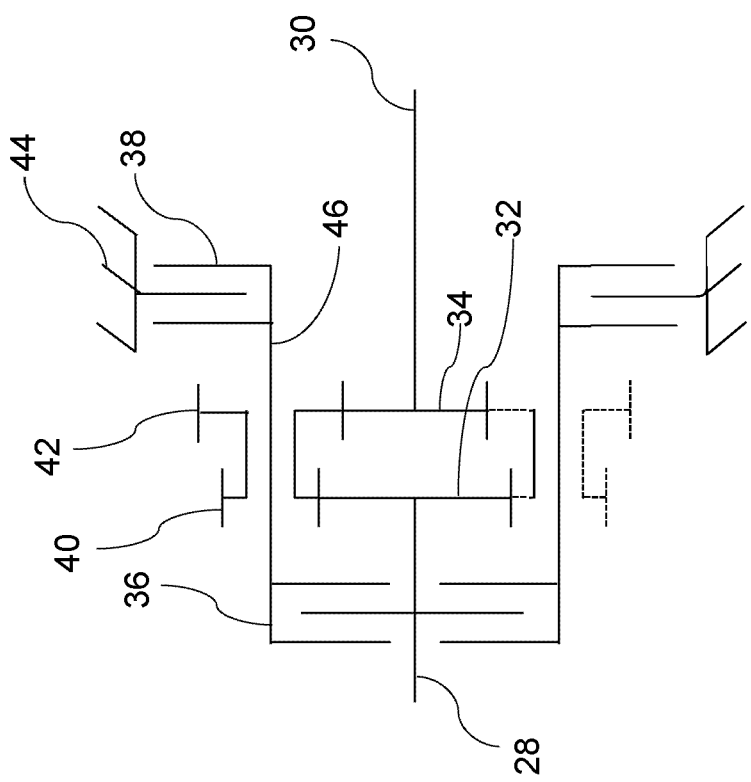
FIG. 3 illustrates a detailed view of the drive train.

FIG. 3 illustrates an epicyclic gear train 24. The power is introduced via the input shaft 28 that comprises a first sun gear 32. The first sun gear 32 meshes with a first planetary gear 40 that may rotate on a planetary gear carrier 46 about the first sun gear 32. Multiple first planetary gears 40 may be provided on the periphery. The first planetary gear 40 is fixedly connected to a second planetary gear 42 with the result that the two planetary gears 40, 42 always have the same rotational speed. The second planetary gear 42 meshes with a second sun gear 34 that is provided on an output shaft 30 of the epicyclic gear train 24.

The epicyclic gear train 24 is mounted in a housing 44. A first clutch device 36 is embodied between the input shaft and the planetary gear carrier 46, the first clutch device rendering possible a rotatably fixed connection with the result that when the first clutch device 36 is closed the planetary gear carrier 46 and the input shaft 28 are operated at the same rotational speed. A second clutch device 38 is embodied between the planetary gear carrier 46 and the housing 44. This renders possible the rotatably fixed connection between the planetary gear carrier 46 and the housing 44 with the result that when the second clutch device 38 is closed, the planetary gear carrier 46 is prevented from rotating relative to the housing 44.

The epicyclic gear train 24 renders three switching states possible in the illustrated embodiment, the switching states rendering it possible to provide a compact embodiment of the entire drive train 18. In a first switching state, the two clutch devices 36, 38 are closed. In this case, any relative rotation, both of the planetary gear carrier 46 as well as of the sun gears 32, 34, is blocked. A parking brake may therefore be realized in particular in the parked state of the working vehicle 10, the parking brake securing the vehicle against rolling away in that any torque that is introduced by the wheels is braced on the housing 44 of the epicyclic gear train.

In the second switching state, the first clutch device 36 is closed while the second clutch device 38 is open. The planetary gear carrier 46 rotates together with the first sun gear 32. A relative rotation of the first and second planetary gears 40, 42 is consequently prevented with the result that the second sun gear 34 likewise rotates together with the first sun gear 32 at the same rotational speed. Consequently, drive power is transmitted by means of the epicyclic gear train 24 without any change. The power may consequently be output directly to the multi-stage gearbox that is connected downstream, particularly for uses that require a lower rotational speed.

In the third switching state, the first clutch device 36 is open and the second clutch device 38 is closed. The planetary gear carrier 46 is held in a rotationally fixed manner on the housing as a result of which the planetary gears rotate in the opposite direction to the first sun gear 32 and in turn drive the second sun gear 34. In one embodiment, this may lead to an increase in the rotational speed of the output shaft 30, by way of example a factor of 2 to 3 has proven advantageous. As a consequence, a further increased rotational speed may be provided to the multi-stage gearbox that is connected downstream, the further increased rotational speed typically only being rendered possible by an enhanced construction of the main shifting gear.

The epicyclic gear train 24 renders at least three switching states possible by the additional ability to power shift under load and it is typically necessary to constructively provide the switching states either in the main shifting gear or in the multi-stage gear box. The entire construction of the drive train 18 may be simplified, wherein the individual transmission segments may be constructed in a less complex manner.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An epicyclic gear train, comprising:
a housing;
an input shaft;
a first sun gear fixedly connected to the input shaft,
an output shaft;
a second sun gear fixedly connected to the output shaft; and
a planetary gear carrier arranged to be movable with respect to the first and second sun gears, and first and second planetary gears arranged to move on the planetary gear carrier;
wherein the planetary gears are fixedly connected to one another and disposed in engagement with the first and second sun gears; and
wherein a first clutch device is disposed between the planetary gear carrier and the first sun gear, and a second clutch device disposed between the housing and the planetary gear carrier, the first and second clutch devices blocking a relative movement between the planetary gear carrier and the first sun gear or between the planetary gear carrier and the housing.

2. The epicyclic gear train of claim 1, wherein the first and second clutch devices are power shifted under load.

3. The epicyclic gear train of claim 1, wherein the first and second clutch devices are multi-plate clutches.

4. The epicyclic gear train of claim 1, wherein the epicyclic gear train does not comprise a ring gear.

5. The epicyclic gear train of claim 1, wherein the first and second sun gears comprise a different size.

6. The epicyclic gear train of claim 1, wherein the first and second sun gears comprise a different module.

7. The epicyclic gear train of claim 1, wherein the first and second sun gears comprise a different pitch.

8. The epicyclic gear train of claim 1, wherein the first and second planetary gears comprise a different size, module, or pitch.

9. The epicyclic gear train of claim 1, wherein a rotational speed of the output shaft corresponds to a rotational speed of the input shaft by closing the first clutch device.

10. The epicyclic gear train of claim 1, wherein a gear transmission ratio change occurs between the input shaft and the output shaft by closing the second clutch device.

11. A working vehicle, comprising:
a drive train;
at least one axle forming part of the drive train;
a drive motor; and
an epicyclic gear train comprising a housing, an input shaft, a first sun gear fixedly connected to the input shaft, an output shaft, a second sun gear fixedly connected to the output shaft, and a planetary gear carrier arranged to be movable with respect to the first and second sun gears;
wherein the first and second planetary gears are movable on the planetary gear carrier;
wherein the planetary gears are fixedly connected to one another and disposed in engagement with the first and second sun gears; and
wherein a first clutch device is disposed between the planetary gear carrier and the first sun gear, and a second clutch device disposed between the housing and the planetary gear carrier, the first and second clutch devices blocking a relative movement between the planetary gear carrier and the first sun gear or between the planetary gear carrier and the housing.

12. The working vehicle of claim 11, wherein the first and second clutch devices are power shifted under load.

13. The working vehicle of claim 11, wherein the first and second clutch devices are multi-plate clutches.

14. The working vehicle of claim 11, wherein the epicyclic gear train does not comprise a ring gear.

15. The working vehicle of claim 11, wherein the first and second sun gears comprise a different size, module or pitch.

16. The working vehicle of claim 11, wherein the first and second planetary gears comprise a different size, module, or pitch.

17. The working vehicle of claim 11, wherein a rotational speed of the output shaft corresponds to a rotational speed of the input shaft by closing the first clutch device.

18. The working vehicle of claim 11, wherein a gear transmission ratio change occurs between the input shaft and the output shaft by closing the second clutch device.

19. An epicyclic gear train, comprising:
a housing;
an input shaft;
a first sun gear fixedly connected to the input shaft;
an output shaft;
a second sun gear fixedly connected to the output shaft; and
a planetary gear carrier arranged to be movable with respect to the first and second sun gears, and first and second planetary gears arranged to move on the planetary gear carrier;
wherein the planetary gears are fixedly connected to one another and disposed in engagement with the first and second sun gears;
wherein a first clutch device is disposed between the planetary gear carrier and the first sun gear, and a second clutch device disposed between the housing and the planetary gear carrier, the first and second clutch devices blocking a relative movement between the planetary gear carrier and the first sun gear or between the planetary gear carrier and the housing;

wherein the first and second sun gears comprise a different size, module or pitch; and wherein the first and second planetary gears comprise a different size, module, or pitch.

20. The epicyclic gear train of claim 19, wherein:

a rotational speed of the output shaft corresponds to a rotational speed of the input shaft by closing the first clutch device; and a gear transmission ratio change occurs between the input shaft and the output shaft by closing the second clutch device.

* * * * *